(12) United States Patent
Melancon et al.

(10) Patent No.: US 6,893,718 B2
(45) Date of Patent: May 17, 2005

(54) PRESSURE SENSITIVE ADHESIVE COMPOSITION, ARTICLES MADE THEREWITH AND METHOD OF USE

(75) Inventors: Kurt C. Melancon, White Bear Lake, MN (US); Timothy D. Filiatrault, Maplewood, MN (US); Shwi-Long J. Hwang, Eagan, MN (US); Rodger J. Pereyra, Cottage Grove, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 323 days.

(21) Appl. No.: 10/151,785

(22) Filed: May 20, 2002

(65) Prior Publication Data

US 2003/0215630 A1 Nov. 20, 2003

(51) Int. Cl.$^7$ .................... B32B 7/12; B32B 27/28; C08L 33/10; C09J 133/10
(52) U.S. Cl. .................. 428/355 AC; 428/343; 428/500; 428/523; 528/363; 528/367; 156/327
(58) Field of Search .................. 428/343, 355 AC, 428/500, 523; 528/363, 367; 156/326, 327

(56) References Cited

U.S. PATENT DOCUMENTS

| | | | |
|---|---|---|---|
| 4,418,120 A | 11/1983 | Kealy et al. | |
| 4,737,577 A | 4/1988 | Brown | |
| 5,800,919 A | 9/1998 | Peacock et al. | |
| 5,885,717 A | 3/1999 | Price et al. | |
| 6,048,431 A | 4/2000 | Clements et al. | |
| 2002/0132111 A1 * | 9/2002 | Zhou et al. ............ | 428/343 |

FOREIGN PATENT DOCUMENTS

| | | |
|---|---|---|
| EP | 0 338 724 | 2/1993 |
| EP | 0 878 527 | 11/1998 |
| JP | 60-120777 | 6/1985 |
| JP | 64-75577 | 3/1989 |
| JP | 2-178379 | 7/1990 |
| JP | 3-281586 | 12/1990 |
| JP | 3-281582 | 12/1991 |
| JP | 3-281585 | 12/1991 |
| JP | 3-281586 | 12/1991 |
| JP | 4-161477 | 6/1992 |
| JP | 5-51566 | 3/1993 |
| JP | 7-11211 | 1/1995 |
| JP | 7-138544 | 5/1995 |
| JP | 8-134408 | 5/1996 |
| WO | WO 97/31077 | 8/1997 |

OTHER PUBLICATIONS

U.S. Appl. No.: 09/998,935; Zhiming Zhou et al.; filed Nov. 30, 2001.
Chemical Abstracts, Columbus, OH, vol. 102, No. 18, May 6, 1985, Abstract no. 150547, p. 54, XP002263541.
Chemical Abstracts, Columbus, OH vol. 103, No. 16, Oct. 21, 1985, Abstract no. 124624, XP002263540.

* cited by examiner

*Primary Examiner*—Michael J. Feely
(74) *Attorney, Agent, or Firm*—Daniel R. Pastirik

(57) ABSTRACT

A pressure sensitive adhesive composition is described, comprising the reaction product of a copolymer and a bisamide crosslinking agent, (A) the copolymer comprising the reaction product of (i) a (meth)acrylate ester of a non-tertiary alcohol in which the alkyl group contains between 1 and 4 carbon atoms, inclusive, and (ii) a carboxylic acid-functional, ethylenically unsaturated co-monomer, and (B) a bisamide crosslinking agent having the formula:

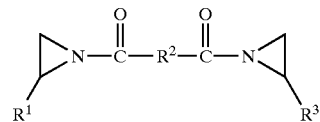

where, $R^1$ and $R^3$ independently, are selected from the group consisting of H and $C_nH_{2n+1}$, n is an integer ranging from 1 to 5, $R^2$ is a divalent radical selected from the group consisting of benzeno ($-C_6H_4-$), substituted benzeno, triazine, $C_mH_{2m}$, and combinations thereof, m is an integer ranging from 1 to 10, and the relative amounts of the carboxylic acid-functional, ethylenically unsaturated co-monomer and the bisamide crosslinking agent providing a ratio of the number of equivalents of amide groups to the number of equivalents of carboxylic acid groups of less than about 0.1. Articles made with the pressure sensitive adhesive composition and methods for its use are also described.

33 Claims, No Drawings

PRESSURE SENSITIVE ADHESIVE COMPOSITION, ARTICLES MADE THEREWITH AND METHOD OF USE

TECHNICAL FIELD

This invention relates to a pressure sensitive adhesive, adhesive articles made therewith and to a method of using the adhesive.

BACKGROUND

Pressure sensitive adhesives (PSA) and tapes made therewith, are used in a variety of applications that expose the PSA and/or the tape to temperatures of 100° C. or higher. For example, PSAs are used to bond printed circuits to heat sinks or rigidizers in many types of automotive and industrial electronics applications such as automobile control modules and other consumer electronics. Another high temperature use for PSAs is in bonding ceramic cook tops to the coated (e.g., painted) metal on stoves. The aforementioned heat sinks are usually made of metals, while rigidizers are normally made of plastics or metals. PSAs are also used to bond ceramic chip components to heat sinks in many electronic devices. In such a use, the tape may be exposed to solder reflow temperatures that are at least 35 to 45° C. above a eutectic Sn/Pb solder liquidus, and these temperatures may be as high as 230° C. to 250° C. where no—Pb (lead free) solder alloys are used. Other examples include use of PSAs in the manufacture of silicon wafers and in the assembly of chip scale packages (CSP). These applications require high temperature, heat tolerant, PSAs that will adhere thin, smooth, silicon wafer surfaces to sapphire surfaces, and will bond chips to flex circuits or adhere one chip to another chip to complete the CSP assembly.

High temperature, or heat tolerant, PSAs and tapes will exhibit good adhesion to a substrate at high temperatures and will permit only low levels of gas generation, or "outgassing." For example, in the solder reflow processing of flex circuits and in the bonding of heat sinks for automotive engine control modules, the PSA must provide an adhesive bond that is strong enough to avoid adhesive delamination at high temperatures for short periods of time. The automotive industry presently employs electrical flex circuits having power transistor components (semiconductors) that are rated to 175° C., i.e., the actual temperature of operation for such semiconductor power transistors may be 175° C. for extended periods of time during normal car operation. Thus PSAs used to bond such flex circuits to heat sinks should provide stable adhesive properties for extended periods of time at temperatures of 175° C.

Contamination can be a problem, particularly in electronics applications, because a contaminant can interfere with subsequent processing steps, and the outgassing of organic or ionic residual components can contaminate a surface and may cause corrosion. The outgassed components can potentially affect the performance or reliability of an electronic device. Sources of these outgassed organic components include unreacted monomer, monomer impurities, and various low molecular weight organic compounds. Sources of ionic residual components include polymerization initiators, polymerization catalysts, and salts used to control certain chemical processes. Industry specifications include ASTM E-595-93 "Standard Test Method for Total Mass Loss and Collected Volatile Condensable Materials From Outgassing in a Vacuum Environment", NASA SP-R-0022 [125° C., 24 hrs, in 2×10 exp.−6 Torr vacuum; Total Mass Loss 0.7% and Collected Volatile Condensable Materials 0.01%)], NASA 1224, and Military Specifications 883/5011 (Ionic contaminants) and 883/1018 (Volatile outgassing).

Because of their thermal stability, silicone-based PSAs are currently used in high temperature applications. However, silicone-based adhesives and tapes are expensive and often do not provide sufficient adhesion at temperatures higher than 150° C. Moreover, they tend to leave adhesive residue following removal, and the residue must be removed from the surface in a separate cleaning step prior to further processing.

Acrylic based PSAs are typically prepared from isooctyl acrylate or 2-ethylhexyl acrylate. These adhesives have many desirable attributes such as high peel adhesion when applied to a wide variety of surfaces. Acrylic PSA's, however, do not typically provide high thermal stability and will slowly degrade upon exposure to higher temperature (e.g., above 125° C.). Thermal degradation of these known acrylic adhesives at higher temperatures reduces the cohesive strength of the adhesive and may generate bubble formation from high levels of outgassing, resulting in a loss of adhesion. It is desirable to provide silicone-free PSA's that will strongly adhere to surfaces at temperatures up to at least about 175° C. or even higher temperatures.

The adhesives and articles described herein provide the requisite heat resistance and low outgassing necessary for adhering an article to a surface at high temperatures.

SUMMARY OF THE INVENTION

The present invention provides, in one aspect, a pressure sensitive adhesive composition comprising the reaction product of a copolymer and a bisamide crosslinking agent,
(A) the copolymer comprising the reaction product of (i) a (meth)acrylate ester of a non-tertiary alcohol in which the alkyl group contains between 1 and 4 carbon atoms, inclusive, and (ii) a carboxylic acid-functional, ethylenically unsaturated co-monomer, and
(B) a bisamide crosslinking agent having the formula:

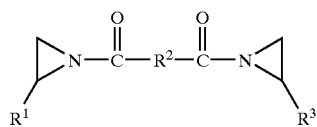

where,
$R^1$ and $R^3$ independently, are selected from the group consisting of H and $C_nH_{2n+1}$,
n is an integer ranging from 1 to 5,
$R^2$ is a divalent radical selected from the group consisting of benzeno (—$C_6H_4$—), substituted benzeno, triazine, $C_mH_{2m}$, and combinations thereof,
m is an integer ranging from 1 to 10, and
the relative amounts of the carboxylic acid-functional, ethylenically unsaturated co-monomer and the bisamide crosslinking agent provides a ratio of the number of equivalents of amide groups to the number of equivalents of carboxylic acid groups of less than about 0.1. To determine this ratio, the weight of each component (comonomer and crosslinking agent) in the composition is divided by its theoretical equivalent weight to obtain the number of equivalents of each component. The ratio of equivalents of amide groups to equivalents of acid groups is then calculated by dividing equivalents (amide groups) by equivalents (acid groups).

The pressure sensitive adhesive composition of the invention provides strong adhesive bonding to any of a variety of surfaces and is especially useful in bonding applications that will experience temperatures up to about 230° C. The pressure sensitive adhesive composition may further comprise an antioxidant. Typically, the relative amounts of the carboxylic acid-functional, ethylenically unsaturated co-monomer and the bisamide crosslinking agent provide a ratio of the number of equivalents of amide groups to the number of equivalents of carboxylic acid groups of less than about 0.05, and often is between about 0.0001 and about 0.05.

In another aspect of the invention, the foregoing adhesive may be used in the construction of an article comprising:

(A) a support layer; and (B) the foregoing pressure sensitive adhesive composition disposed on the support layer.

In still another aspect, the invention provides a method for adhering a first substrate and a second substrate to one another, the method comprising:

(A) providing a pressure sensitive adhesive composition as described above;

(B) adhering the pressure sensitive adhesive composition to the first substrate; and (C) adhering the pressure sensitive adhesive composition to the second substrate to bond the first and second substrates together.

In this aspect of the invention, at least one of the first substrate and the second substrate may be operatively associated with a heat source capable of causing the temperature of the first substrate or the second substrate to be within the range from about 100° C. to about 230° C. Accordingly, the foregoing method may further comprise (D) heating at least one of the first substrate and the second substrate to a temperature within the range from about 100° C. to about 230° C. without causing the pressure sensitive adhesive to detach from the first substrate or the second substrate. The first and second substrates may comprise any of a variety of materials, but the adhesives and methods of the invention are especially useful in the bonding of heat sinks to printed circuits, such as printed circuit boards and flexible circuits, in an electronic component mounted in an automobile engine control module assembly within the engine compartment of an automobile. In this application, the PSA is capable of withstanding temperatures greater than about 175° C. for extended periods of time without delaminating or experiencing adhesive bond failure and without significant weight loss due to outgassing of volatile components. The adhesive of the invention may also be used in other high temperature applications such as holding silicon wafers to sapphire surfaces during the wafer grinding process and bonding ceramic chip components to heat sinks in various electronic devices.

Additional details of one or more embodiments of the invention are set forth in the description below. Other features, objects, and advantages of the invention will be apparent from the description and from the claims.

DETAILED DESCRIPTION OF THE PREFERRED EMBODIMENT

The present invention provides a pressure sensitive acrylic adhesive useful for adhering substrates that are exposed to high temperatures. The adhesive exhibits low outgassing or weight loss at elevated temperatures. Surprisingly, the adhesive of the invention typically exhibits a total weight loss of no greater than about 5 wt. % after 3.5 hours at 175° C. as determined by the test method described in the Examples. The adhesive composition may be extruded, coated, or sprayed directly onto a substrate or surface that is to be bonded to another substrate or surface. The pressure sensitive acrylic adhesive of the invention comprises the reaction product of (a) a copolymer comprising the reaction product of (i) a (meth)acrylate ester of a non-tertiary alcohol in which the alkyl group contains between 1 and 4 carbon atoms, inclusive; and (ii) a carboxylic acid-functional, ethylenically unsaturated co-monomer; and (b) a bisamide crosslinking agent.

The invention also provides adhesive articles such as tapes and the like comprising a layer of the foregoing pressure sensitive acrylic adhesive disposed on a support. The support may be a release substrate or liner to provide a so-called transfer tape wherein the exposed adhesive may be placed in contact with a substrate or surface and the release liner may thereafter be stripped away from the adhesive to expose another portion of the adhesive for bonding to another substrate or surface. The adhesive article may be provided as a tape or an adhesive sheet which can be prepared by any of a variety of known methods such as by extruding, coating, or spraying the adhesive composition onto a support layer. The resulting tape or sheet can be supported or unsupported. The pressure sensitive acrylic adhesive tape or sheet can be laminated onto a surface or substrate. The tape or sheet can also be die-cut into any desired shape.

The thickness of the adhesive layer can vary as may be required for any individual application. A typical thickness for the adhesive layer may be about 0.002 inch (0.051 mm). However, the thickness of the adhesive layer can range from about 0.001 inch (0.025 mm) to about 0.045 inches (1.125 mm), typically from about 0.002 inch (0.051 mm) to about 0.010 inch (0.25 mm), and most often from about 0.002 inch (0.051 mm) to about 0.005 inch (0.125 mm).

The adhesive article is particularly useful for adhering a first substrate to a second substrate. In particular, the adhesive article is useful for applications that require adhesive bonding to substrates that are subjected to or which generate high temperatures. For example, when the adhesive article is an adhesive transfer tape, an exposed or first surface of the adhesive is applied to a first surface on the first substrate. The release liner is then removed or stripped from the adhesive so that the thus exposed second surface of the adhesive may be attached to a second surface on a second substrate to thereby bond the first and second substrates together. The adhesives of the invention may be used in applications in which the surface of the first and/or second substrate experiences temperatures within the range from about 100° C. to about 230° C.

In one application, the acrylic PSA of the invention may be used to bond heat sinks to printed circuits, such as printed circuit boards and flexible circuits, in an electronic component mounted in an automobile control module assembly within the engine compartment. In this application, the PSA is capable of withstanding engine temperatures greater than about 175° C. for extended periods of time without delaminating or experiencing adhesive bond failure and without significant weight loss due to outgassing of volatile components. Additionally, the electronic component may be a component in a semiconductor power transistor which may itself generate heat. Other examples of high temperature applications include holding silicon wafers to sapphire surfaces during the wafer grinding process and bonding ceramic chip components to heat sinks in various electronic devices. The PSA of the invention and articles made therewith are especially suitable for bonding electronic components operating in high temperature environments such as in or near automobile engines and the like. The PSA of the invention can also function as a vibration damping material and can be optionally combined with a constraining layer, typically a thin metal layer, to provide a constrained layer damper. In still another application, the PSA of the invention can be used in bonding ceramic cook tops to the coated (e.g., painted) metal body of a stove.

The adhesive articles of the invention generally include at least one support layer having at least one major surface with a pressure sensitive acrylic adhesive disposed on the major surface of the support layer. Examples of possible support layers include various papers such as glassine, clay or polyethylene coated papers; polymeric films such as high density and low density polyethylene, polypropylene, and polyester. If the article of the invention is a transfer tape, the support layer is normally coated on one or both sides with a release material, such as a silicone release material. Especially useful are support layers coated with release material, i.e., release liners, and which can survive solder reflow processing. An example of a suitable liner is the 78# (78 lb/3000 ft basis wt.) clay coated paper liner available from Loparex Inc. (Willowbrook, Ill.). The support layer can also be a differential release liner, i.e., a release liner having a first release coating on one side of the liner and a second release coating coated on the opposite side. The two release coatings should normally have different release values. For example, one release coating may have a release value of 5 grams/cm (i.e., 5 grams of force is needed to remove a strip of material 1 cm wide from the coating) while the second release coating may have a release value of 15 grams/cm. The pressure sensitive acrylic adhesive is typically coated over the surface of the release liner having the higher release value for the associated release coating and the adhesive article can be wound into a roll. As the roll is unwound, the pressure sensitive adhesive adheres to the release coating with the higher release value. After the adhesive article is applied to a substrate or surface, the release liner can be removed to expose the remaining adhesive surface for possible bonding to another surface.

Where desired, the adhesives articles may also include a reinforcing layer positioned within the layer of acrylic PSA. The reinforcing layer of the adhesive article may be selected from a wide variety of materials suited for exposure to high temperatures and, optionally, high pressures without significant deterioration. The reinforcing layer should comprise a low amount of volatile components so that the layer will experience low outgassing with little weight loss when subjected to elevated temperatures. Examples of reinforcing layers include porous films, nonporous films, foils, woven webs, non-woven webs, scrims, papers, fabrics, polymers, metals, ceramics, natural fibers, and combinations thereof. The reinforcing layer may be thermally conductive, electrically conductive, or both thermally and electrically conductive. Examples of suitable reinforcing materials include tear resistant materials, such as those disclosed in U.S. Pat. No. 6,048,431 (Clements et al.), and thermally stable materials (e.g., those that exhibit little or no shrinkage upon exposure to elevated temperatures), such as polyimides, polyamides, poly(tetrafluoroethylenes), and polyesters such as polyethylene terephthalate and polyethylene naphthalate. The polyesters preferably are heat stabilized. Examples of suitable polymeric materials include those sold under the trade designations KAPTON and TEFLON (available from E. I. DuPont de Nemours Co., Wilmington, Del.), KALADEX (available from Imperial Chemical Industries P.L.C., United Kingdom) and NYLON. Particularly preferred materials include polyimides such as those sold under the trade designation KAPTON. If desired, the reinforcing layer can be modified prior to application of the adhesive composition to enhance adhesion between the adhesive and the reinforcing layer by applying a primer composition to the reinforcing layer or by exposing the reinforcing layer to a corona or flame treatment, as is known in the art. The use of a primer may be desired when using a polyethylene terephthalate or a polyethylene naphthalate reinforcing layer. The thickness of the reinforcing layer is normally less than about 0.020 inches (0.51 mm), typically less than about 0.010 inch (0.25 mm), and more often less than about 0.005 inch (0.125 mm).

The adhesive articles can be adhered to any of a variety of surfaces made from materials that include polymers, plastics, metals, metal oxides, glasses, painted metals, primed metals, fiber reinforced composites, paper, sealed wood, and combinations thereof. Without limitation, the surface can be the surface of an electronic component as well as the surface of a component used in the aerospace industry. For example, the surface may be silicon, a metal (e.g., aluminum, copper, gold, silver, or other metals), a metal oxide, a fiber reinforced composite, or a polymeric material typically used in the electronics industry. The polymeric material may be a film having metal traces on its surface (e.g., a flexible circuit). The surface can also include an epoxy-coated aluminum substrate, as used in the aerospace industry. Various combinations of these materials may also form the surface. Those skilled in the art will appreciate that the invention is not limited in any way to the type of surfaces to which the adhesives of the invention are bonded.

The tapes and articles of the invention can be die cut into any desired shape such as circles, rings, squares, or the shape of the surface or substrate to which it is adhered.

The adhesive composition is a crosslinked pressure sensitive adhesive composition comprising the reaction product of an acrylic copolymer and a bisamide crosslinking agent. The copolymer, in turn, is the reaction product of at least (a) a (meth)acrylate ester of a non-tertiary alcohol in which the alkyl group (on the alcohol) contains about 1 to 4 carbon atoms (on average), generally 2 to 4 carbon atoms, and (b) a carboxylic acid-functional, ethylenically unsaturated co-monomer. Examples of suitable (meth)acrylate esters, which may be used alone or in combination with each other, include for example, methyl acrylate, ethyl acrylate, n-propyl acrylate, and n-butyl acrylate. Examples of useful carboxylic acid-functional monomers, which may be used alone or in combination with each other, include acrylic acid, methacrylic acid, itaconic acid, maleic acid, and fumaric acid.

Up to 20% by weight based on the total weight of monomers of other monomers, such as reinforcing monomers, may be used in addition to monomers (a) and (b) above. For example, ethylenically unsaturated monomers whose homopolymers have a Tg of at least about 0° C. may be used. Examples of other monomers that may be co-polymerized with the (meth)acrylate ester and carboxylic acid-functional monomers include 2-ethylhexylacrylate, (meth)acrylamide, alpha-olefins, vinyl ethers, allyl ethers, styrene, maleic acid esters, 2-hydroxyethyl (meth)acrylate, cyclohexyl acrylate, t-butyl acrylate, phenyl acrylate, isobornyl acrylate, 2-phenoxyethyl acrylate, N-vinyl pyrrolidone, N-vinyl caprolactam, and substituted acrylamides such as N-ethyl acrylamide, N-hydroxyethyl acrylamide, N-octyl acrylamide, N-t-butyl acrylamide, N,N-dimethyl acrylamide, N,N-diethyl acrylamide, and N-ethyl-N-dihydroxyethyl acrylamide.

The crosslinking agent is an aromatic bisamide crosslinking agent having the formula:

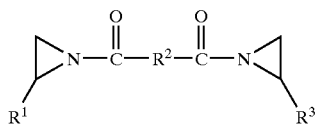

where $R^1$ and $R^3$ independently, are selected from the group consisting of H and $C_nH_{2n+1}$ where n is an integer ranging from 1 to 5, and $R^2$ is a divalent radical selected from the group consisting of benzeno ($-C_6H_4-$), substituted benzeno, triazine, $C_mH_{2m}$ where m is an integer ranging from 1 to 10, and combinations thereof. A particularly useful bisamide crosslinking agent having this formula is 1,1'-isophthaloyl-bis(2-methylaziridine) [CAS No. 7652-64-4].

The amounts of carboxylic acid-functional co-monomer and bisamide crosslinking agent are typically selected to produce a crosslinked adhesive that adheres well at high temperatures. The amount of the co-monomer is normally between about 1% and about 25% by weight, inclusive, based upon the total weight of the copolymer, more typically between about 1% and 20% by weight, inclusive, or often between about 2 and 15% by weight, inclusive. Typically, the relative amounts of carboxylic acid-functional co-monomer and bisamide crosslinking agent is selected so that the ratio of the number of equivalents of amide groups to the number of equivalents of carboxylic acid groups is less than about 0.1. More typically, the ratio of the number of equivalents of amide groups to the number of equivalents of carboxylic acid groups is less than about 0.05, and generally will be between 0.0001 and 0.05. Most typically, the ratio of the number of equivalents of amide groups to the number of equivalents of carboxylic acid groups will be between 0.0001 and 0.05.

Antioxidants suitable for inclusion in the adhesive include but are not limited to hindered phenols, sulfur-containing organo-metal salts, substituted hydroquinones, and the like. Combinations of antioxidants may also be used. Examples of hindered phenols are the ortho-substituted or 2,5-di-substituted hindered phenols in which each substitutient group is a branched hydrocarbon radical having 3–20 carbon atoms, e.g., tertiary butyl or tertiary amyl and para-substituted phenols where the substitutient group is —OR, R being methyl, ethyl, 3-substituted propionic ester, etc. Examples of suitable hindered phenols include sterically hindered phenols such as IRGANOX 1010 and IRGANOX 1076 both available from Ciba Specialty Chemicals, Tarrytown, N.Y. An example of a substituted hydroquinone is 2,5-di(tertiary amyl)hydroquinone. Among the sulfur-containing organo-metal salts are the nickel or zinc derivatives of dibutyl thiocarbamate. Additional antioxidants (i.e., secondary antioxidants) may be present in the adhesive composition. The antioxidant is present in the adhesive composition in an amount sufficient to prevent, reduce, or decrease the rate of degradation of the adhesive composition at high temperatures. The amount of antioxidant is typically no greater than 5% by weight based on the total weight of copolymer, and preferably between 0.1% by weight and 5% by weight inclusive. In at least some embodiments, IRGANOX 1010 hindered phenol is added to the adhesive composition in an amount of less than about 5% by weight based on the total weight of the copolymer.

The adhesive may include optional conventional additives such as tackifiers, plasticizers, flow modifiers, neutralizing agents, stabilizers such as ultraviolet stabilizers and heat stabilizers, fillers, particulates, thermally conductive agents, electrically conductive agents, antistatic agents, dyes, colorants, polymeric microspheres, glass microspheres, ceramic microspheres, expandable microspheres, nanoparticles, and the like, as long as they do not interfere with the desired performance characteristics of the adhesive. Examples of optional tackifiers for an acrylic pressure sensitive adhesive include terpene phenolics, rosins, rosin esters, esters of hydrogenated rosins, synthetic hydrocarbon resins and combinations thereof In certain embodiments, the adhesive of the present invention may contain less than 5% by weight tackifier, if any. Additionally, the adhesive may optionally comprise a plasticizer. The plasticizer may be chosen so that it is compatible with the adhesive. Examples of plasticizers include phthalate esters, polyethylene oxides, adipic acid esters, phosphoric acid esters, sulfonamides, benzoic acid esters, polypropylene oxides and formic acid esters. If present, the adhesive of the present invention may contain less than 1% plasticizer.

The adhesive composition is preferably prepared via a solution polymerization method using a thermally activated free radical initiator. Examples of useful initiators include azo compounds such as 2,2'-azobis (isobutyronitrile), hydroperoxides such as tert-butyl peroxide, and peroxides such as benzoyl peroxide and cyclohexanone peroxide.

EXAMPLES

The following non-limiting Examples further illustrate features of the preferred embodiment. All parts, percentages, ratios, and the like that are disclosed in the Examples and elsewhere in the specification are by weight unless indicated otherwise.

Test Methods
90 Degree Peel Adhesion Strength Test

This test method was based on ASTM D 3330 "Standard Test Method for Peel Adhesion of Pressure-Sensitive Tape," American Society for Testing and Materials, West Conshohocken, Pa. Pressure sensitive adhesive tape samples, prepared as described in the Examples and having release liners on each side of the tape, were cut into one inch (2.54 centimeter (cm)) wide test strips having a length of about six inches (15.2 cm). One liner was removed and the test strip was applied to an aluminum panel (adhesive in contact with the aluminum) using a 4.5 pound (2.04 kilogram (kg)) rubber roller by passing the roller over the test strip lengthwise three times in each direction. Prior to application of the test strip, the aluminum panel was cleaned with 1:1 blend by weight of 2-propanol (IPA) and water and KIMWIPE™ EX-L paper tissue (available from Kimberly-Clark, Atlanta, Ga.) and dried at ambient temperature. The remaining release liner was removed and the anodized side of an about 165 mm (6.5 inches) long by about 28.6 mm (1.125 inches) wide by 0.127 mm (0.005 inches) thick anodized aluminum foil was laminated to the test strip using a 4.5 pound (2.04 kilogram (kg)) rubber roller by passing the roller over the test strip lengthwise 3 times in each direction. The sample thus prepared was placed in an air circulating oven at about 225° F. (107° C.) for 15 minutes then allowed to dwell at room temperature (about 23° C.) for about 15 hours. Then the sample was tested at room temperature (about 23° C.).

The 90° angle peel adhesion strength of each test strip was then measured using an INSTRON Model 4465 tensile tester (available from INSTRON Corporation, Canton, Mass.) equipped with a five pound (22.3 N) load cell at a rate of 12 inches/minute (30.5 cm/minute) at an angle of 90 degrees.

The length of tape extending past the substrate was attached to the dynamic jaw (grip) of the INSTRON tester.

The test data were analyzed using Series IX software (available from INSTRON Corporation, Canton, Mass.) to obtain the average peel adhesion strength in pounds/inch width (piw) which was converted to kilonewtons/meter (kN/m). Peel data was acquired over a five second test period after the initial startup force had stabilized. A portion of each test strip was peeled back and the average peel force value was measured.

The results from three test strips were used to obtain an average peel adhesion strength value for each Example. This test method was repeated with new test strips at each of four additional test temperatures: 107° C., 150° C., 175° C., and 230° C. The test strips were tested after two minutes dwell at the test temperature before testing.

Constant Temperature Thermogravimetric Analysis (TGA) For Weight Loss

Samples were analyzed by placing approximately 20–30 milligrams (mg) (original sample weight accurately weighed) of sample to be tested in a TA Instruments 2950 HI-RES Modulated Thermogravimetric Analyzer (available from TA Instruments Inc., New Castle, Del.) running under air atmosphere in standard mode. The sample temperature was increased from ambient (22° C.) to the desired set point (either 150° C. or 175° C. as indicated in the Examples) using the instruments highest heating rate and maintained at the set point for 3.5 hours. Sample weight was monitored continuously from the moment the sample reached the set point for 3.5 hours to provide weight loss data as a function of time. Results are reported as percent weight loss based on the original weight of the sample.

Determination Of Oxidative Onset Temperature (OOT)

Samples were prepared and tested according to ASTM E2009-99 "Standard Test Method for Oxidation Onset Temperature of Hydrocarbons by Differential Scanning Calorimetry", American Society for Testing and Materials, West Conshohocken, Pa. Briefly stated, this standard required the following.

1. Instrument temperature calibration using indium and tin standards heated at 10° C./minute;
2. Specimens weighed using an analytical balance to 0.01 mg precision.
3. Specimens tested in an open aluminum pan (no lid).
4. Sample weight ranges from 3.0–3.5 mg.

The test was performed using a PERKIN ELMER DSC 7 calorimeter (available from PerkinElmer Instruments, Shelton, Conn.) purged with air at a flow rate of 50 milliliters/minute. A linear heating rate of 10° C./minute was applied as the sample was heated from 30° C. through the onset of the sample exotherm. Data output was displayed as a heat flow curve. The extrapolated onset of the exothermic processes was determined using the resulting heat flow curve. Results are reported in degrees Celsius (° C.).

Examples 1–2

Two acrylic pressure sensitive adhesives containing a 95:5 wt. ratio of n-butyl acrylate:acrylic acid were prepared by first polymerizing the acrylic monomers, then adding a solution of bisamide crosslinker to the solution polymer. More specifically, 114 parts n-butyl acrylate (herein "BA"), 6 parts acrylic acid ("AA"), 0.24 parts VAZO® 67 thermal polymerization initiator (available from E. I. du Pont de Nemours and Company, Wilmington, Del.), and 180 parts of ethyl acetate (EtOAc) as solvent, were added to a glass bottle. A nitrogen gas purge was run through the solution for about 5 minutes, followed by capping of the bottle. The capped bottle was placed in a rotating launderometer at a temperature of 55° C. for 24 hours. After removal from the launderometer the bottle was allowed to cool to room temperature (about 24° C.). The solids level was measured and found to be 40%. This first polymer solution (polymer solution A) was then diluted to 20% solids by adding 100 parts 2-propanol (IPA) and 200 g. EtOAc to provide polymer solution B.

Next, to 75 parts of polymer solution B was added 0.15 parts IRGANOX 1010 antioxidant (available from Ciba Specialty Chemicals of Tarrytown, N.Y.) followed by a 5.36% solution of 1,1'-isophthaloyl-bis(2-methylaziridine) crosslinker (CAS No. 7652-64-4) in toluene using the amounts in Table 1. The bottle was recapped and placed on a shaker for about 1 hour. A homogeneous pressure sensitive adhesive solution was obtained.

The ratio of acrylic monomers, amount of bisamide crosslinker solution, the % crosslinker based on the total amount of copolymer, and the ratio of equivalents (amide groups) to equivalents (acid groups) are shown in Table 1.

TABLE 1

| Example | Ratio BA/AA | Bisamide Solution parts | Percent Bisamide Crosslinker (%) | Eq. Amide/ Eq. Acid |
|---|---|---|---|---|
| 1 | 95/5 | 0.15 | 0.05 | 0.00519 |
| 2 | 95/5 | 0.30 | 0.10 | 0.01006 |

This solution was coated onto a siliconized differential release liner using a knife-over-bed notched bar coating station and placed in a circulating air oven set at 158° F. (70° C.) for about 10 minutes to obtain a dried adhesive thickness of about 0.002 inch (0.051 mm). The samples thus obtained were then aged for 3 days at 158° F. (70° C.) before testing. The test tape was evaluated for peel adhesion according to the test method described above. The results are shown in Table 4.

Examples 3–4

Two acrylic pressure sensitive adhesives containing a 92.5:7.5 wt. ratio of n-butyl acrylate:acrylic acid were prepared by first polymerizing acrylic monomers, then adding a solution of bisamide crosslinker to the solution polymer. More specifically, 231.25 parts n-butyl acrylate (BA), 18.75 parts acrylic acid (AA), and 594.7 parts acetone were added to a reaction vessel that was previously flushed with nitrogen. A nitrogen gas purge was run through the solution, then under nitrogen, 0.3 parts per 100 parts of monomers (phr) VAZO® 67 was added. The vessel was capped and the polymerization proceeded at a temperature of 59.5° C. for 24 hours. After removal from the vessel, the polymer solution (polymer solution C) was allowed to cool to room temperature (about 24° C.). The solids level was 29.3%.

Next, to a bottle containing 50 parts of polymer solution C, 0.15 parts IRGANOX 1010 was added followed by the bisamide crosslinker solution of Example 1–2, using the amounts in Table 2. The bottle was capped and placed on a shaker for about 1 hour to obtain a homogeneous pressure sensitive adhesive solution.

The ratio of acrylic monomers, amount of bisamide crosslinker solution, the % crosslinker based on the total weight of copolymer, and the ratio of equivalents (amide groups) to equivalents (acid groups) are shown in Table 2.

TABLE 2

| Example | Ratio BA/AA | Bisamide Solution parts | Percent Bisamide Crosslinker (%) | Eq. Amide/Eq. Acid |
|---|---|---|---|---|
| 3 | 92.5/7.5 | 0.15 | 0.05 | 0.004257 |
| 4 | 92.5/7.5 | 0.30 | 0.10 | 0.008249 |

Tape samples were prepared and tested as in Examples 1–2 and the test results are shown in Table 4.

Examples 5–6

Two acrylic pressure sensitive adhesives containing a 90:10 wt. ratio of n-butyl acrylate:acrylic acid were prepared using the procedure of Examples 1–2 except 81 parts BA, 9 parts AA, 0.18 parts VAZO 67, and 210 parts EtOAc were used to prepare polymer solution D, the solids level was measured and found to be 30%, and polymer solution D was diluted to 20% solids by adding 60 parts 2-propanol (IPA) and 90 parts EtOAc to provide polymer solution E.

The ratio of acrylic monomers, amount of bisamide crosslinker solution, the % crosslinker based on the total weight of copolymer, and the ratio of equivalents (amide groups) to equivalents (acid groups) are shown in Table 3.

TABLE 3

| Example | Ratio BA/AA | Bisamide Solution parts | Percent Bisamide Crosslinker (%) | Eq. Amide/Eq. Acid |
|---|---|---|---|---|
| 5 | 90/10 | 0.15 | 0.05 | 0.003462 |
| 6 | 90/10 | 0.30 | 0.10 | 0.006741 |

90 Degree Peel Adhesion Strength Test—Examples 1–6

Tape samples were tested according to the 90 Degree Peel Adhesion Strength Test. The results are shown in Table 4.

TABLE 4

| | Peel Adhesion Strength in lbs./inch (kN/m) | | | | |
|---|---|---|---|---|---|
| Example | at 23° C. | at 107° C. | at 150° C. | at 175° C. | at 230° C. |
| 1 | 4.4 (0.77) | 2.2 (0.39) | 2.6 (0.46) | 2.2 (0.39) | 1.3 (0.22) |
| 2 | 3.8 (0.67) | 1.6 (0.28) | 1.2 (0.21) | 1.1 (0.19) | 0.7 (0.12) |
| 3 | 4.1 (0.72) | 5.2 (0.91)[a] | 3.3 (0.58)[a] | 2.3 (0.40)[a] | 1.4 (0.25)[a] |
| 4 | 4.0 (0.70) | 1.4 (0.25) | 1.3 (0.22) | 1.3 (0.22) | 0.8 (0.14) |
| 5 | 6.9 (1.21) | 4.5 (0.79)[a] | 4.1 (0.72)[a] | 3.9 (0.69)[a] | 2.8 (0.49)[a] |
| 6 | 6.6 (1.16) | 2.8 (0.49) | 2.6 (0.46) | 2.3 (0.40) | 2.1 (0.37)[a] |

[a]Indicates cohesive failure of at least 2 of the 3 test sample bonds.

The data in Table 4 show that peel adhesion increases as the amount of crosslinking agent increases.

Comparative Examples C-1 and C-2

Two acrylic pressure sensitive adhesives containing a 90:10 wt. ratio of 2-ethylhexyl acrylate (2-EHA):acrylic acid were prepared using the procedure of Examples 1–2 except that 135 parts 2-EHA, and 15 parts AA were used as the monomers to prepare polymer solution F, the solids level was measured and found to be 29.73%, and bisamide crosslinker solution was added to a mixture of 50.46 parts polymer solution F, 9.54 parts EtOAc, and 0.15 parts IRGANOX 1010 to provide a polymer solution G containing approximately 25% solids.

The ratio of acrylic monomers, amount of bisamide crosslinker solution, the % crosslinker based on the total weight of copolymer, and the ratio of equivalents (amide groups) to equivalents (acid groups) are shown in Table 5.

TABLE 5

| Example | Wt. ratio (2-EHA/AA) | Bisamide Solution parts | Percent Bisamide Crosslinker (%) | Eq. Amide/Eq. Acid |
|---|---|---|---|---|
| C-1 | 90/10 | 0.14 | 0.05 | 0.002905 |
| C-2 | 90/10 | 0.28 | 0.10 | 0.005814 |

Tape samples were prepared and tested as in Examples 1–2. The test results are shown in Table 7 below.

Comparative Examples C-3 and C-4

Two acrylic pressure sensitive adhesives containing a 90:10 wt. ratio of isooctyl acrylate (IOA):acrylic acid were prepared using the procedure of Examples 1–2 except that 135 parts IOA, and 15 parts AA were used as the monomers to prepare polymer solution H, the solids level was measured and found to be 29.00%.

Then to a blend of 0.15 parts of IRGANOX 1010 in 8.32 parts EtOAc was added to 52 parts of polymer solution H followed by the bisamide crosslinker solution to provide polymer solution 1. The solids level of polymer solution I was calculated to be about 25.00%.

The ratio of acrylic monomers, amount of bisamide crosslinker solution, the weight % crosslinker based on the total weight of copolymer, and the ratio of equivalents (amide groups) to equivalents (acid groups) are shown in Table 6.

TABLE 6

| Example | Ratio (IOA/AA) | Bisamide Solution (parts) | Percent Bisamide Crosslinker (%) | Eq. Amide/Eq. Acid |
|---|---|---|---|---|
| C-3 | 90/10 | 0.14 | 0.05 | 0.002890 |
| C-4 | 90/10 | 0.28 | 0.10 | 0.005784 |

Tape samples were prepared and tested as in Examples 1–2. The test results are shown in Table 7. Results for Examples 5 and 6, already reported in Table 4, are repeated here for comparison.

90 Degree Peel Adhesion Strength Test

Examples 5–6 and Comparative Examples C-1 through C-4

Tape samples from Examples 5–6 and Comparative Example C1 to C-4 were tested according to the 90 Degree Peel Adhesion Strength Test.

TABLE 7

| Ex. | % Bisamide | Monomer/ Comonomer | Peel Adhesion Strength in lbs./inch (kN/m) | | | | |
|---|---|---|---|---|---|---|---|
| | | | at 23° C. | at 107° C. | at 150° C. | at 175° C. | at 230° C. |
| 5 | 0.05 | 90/10 BA/AA | 6.9 (1.21) | 4.5 (0.79)[a] | 4.1 (0.72)[a] | 3.9 (0.69)[a] | 2.8 (0.49)[a] |
| C-1 | 0.05 | 90/10 2EHA/AA | 6.6 (1.16) | 3.0 (0.53) | 4.8 (0.84)[a] | 2.2 (0.39) | 2.2 (0.39)[a] |
| C-3 | 0.05 | 90/10 IOA/AA | 9.0 (1.58) | 3.0 (0.53) | 3.2 (0.56) | 3.2 (0.56)[a] | 1.9 (0.33)[a] |
| 6 | 0.10 | 90/10 BA/AA | 6.6 (1.16) | 2.8 (0.49) | 2.6 (0.46) | 2.3 (0.40) | 2.1 (0.37)[a] |
| C-2 | 0.10 | 90/10 2EHA/AA | 6.3 (1.11) | 2.2 (0.39) | 2.0 (0.35) | 0.9 (0.16) | 1.1 (0.19) |
| C-4 | 0.10 | 90/10 IOA/AA | 7.7 (1.35) | 2.2 (0.39) | 1.7 (0.30) | 1.5 (0.26) | 0.7 (0.12) |

[a]cohesive failure of at least 2 of the 3 test sample bonds

From the data it can be seen that use of butyl acrylate (BA) provides a composition that has superior adhesion at high temperatures (i.e., 175° C. and 230° C.) compared to compositions with isooctyl acrylate (IOA) or 2-ethylhexyl acrylate (2EHA). In general, the Example 5 and Example 6 materials will provide very good peel adhesion properties even at elevated temperatures while also showing little or no signs of weight loss due to outgassing.

Example 7

Eleven acrylic pressure sensitive adhesives were each prepared by first blending in a bottle a polymer solution containing 50 parts of a copolymer having the composition 90:10 ratio of BA:AA in toluene and ethyl acetate at 32.9% solids (available from Soken Chemical and Engineering Co., Ltd., Tokyo, Japan, as SK DYNE 1310), IRGANOX 1010, and 15.8 parts of EtOAc.

The bisamide crosslinker solution of Examples 1–2, which had been diluted with toluene to about 2% solids in toluene, was added to the foregoing polymer solution. The bottle was capped and placed on a rotary agitator for about 2 hours to provide a solution of a pressure sensitive acrylic adhesive. The amount of bisamide crosslinker solution, the ratio of equivalents (amide groups) to equivalents (acid groups), and the wt. %/phr crosslinker based on the total weight of copolymer and of IRGANOX 1010 used are shown in Table 8.

TABLE 8

| Example | IRGANOX 1010 (parts) | Parts IRGANOX 1010 per 100 parts copolymer (phr) | Bisamide Solution (parts) | Parts Bisamide Crosslinker per 100 parts copolymer (phr/wt. %) | Eq. Amide/ Eq. Acid |
|---|---|---|---|---|---|
| 7-1 | 0.247 | 1.500 | 0.120 | 0.0146 | 0.0008478 |
| 7-2 | 0.247 | 1.500 | 0.411 | 0.0500 | 0.002903 |
| 7-3 | 0.130 | 0.793 | 0.411 | 0.0500 | 0.002903 |
| 7-4 | 0.329 | 2.000 | 0.206 | 0.0250 | 0.001455 |
| 7-5 | 0.247 | 1.500 | 0.411 | 0.0500 | 0.002903 |
| 7-6 | 0.329 | 2.000 | 0.617 | 0.0750 | 0.004359 |
| 7-7 | 0.247 | 1.500 | 0.702 | 0.0854 | 0.004960 |
| 7-8 | 0.165 | 1.000 | 0.206 | 0.0250 | 0.001455 |
| 7-9 | 0.247 | 1.500 | 0.411 | 0.0500 | 0.002903 |
| 7-10 | 0.363 | 2.207 | 0.411 | 0.0500 | 0.002903 |
| 7-11 | 0.165 | 1.000 | 0.617 | 0.0750 | 0.004359 |

Tape samples were prepared with the adhesives of Example 7 and tested as for peel adhesion according to the 90 Degree Peel Adhesion Strength Test. The results are shown in Table 9. Dry samples were subjected to Constant Temperature Thermogravimetric Analysis (TGA) for Determination of Oxidative Onset Temperature (OOT) according to the test method outlined above. Results are in Table 9.

TABLE 9

| Example | Oxidative Onset Temp, ° C. | Peel Adhesion Strength in lbs./inch (kN/m) | | | |
|---|---|---|---|---|---|
| | | at 23° C. | at 150° C. | at 175° C. | at 230° C. |
| 7-1 | 278.8 | 7.7 (1.35) | 0.9 (0.16)[a] | 0.5 (0.09)[a] | 0.3 (0.053)[a] |
| 7-2 | 285.4 | 7.4 (1.3) | 2.5 (0.44)[a] | 2.3 (0.40)[a] | 1.3 (0.22)[a] |
| 7-3 | 275.4 | 7.4 (1.3) | 2.2 (0.39)[a] | 2.3 (0.40)[a] | 1.4 (0.25)[a] |
| 7-4 | 284.8 | 8.1 (1.42) | 1.5 (0.26)[a] | 1.6 (0.28)[a] | 0.9 (0.16)[a] |
| 7-5 | 284.1 | 7.5 (1.32) | 2.8 (0.49)[a] | 2.5 (0.44)[a] | 1.4 (0.25)[a] |
| 7-6 | 278.8 | 6.3 (1.11) | 1.9 (0.33) | 2.6 (0.46)[a] | 1.7 (0.30)[a] |
| 7-7 | 284.5 | 6.1 (1.07) | 1.3 (0.22) | 2.3 (0.40) | 1.5 (0.26) |
| 7-8 | 279.5 | 6.4 (1.13) | 1.6 (0.28)[a] | 1.4 (0.25)[a] | 0.6 (0.11)[a] |
| 7-9 | 284.5 | 6.7 (1.18) | 3.1 (0.54)[a] | 2.7 (0.47) | 1.9 (0.33)[a] |

TABLE 9-continued

| Example | Oxidative Onset Temp, °C. | Peel Adhesion Strength in lbs./inch (kN/m) | | | |
|---|---|---|---|---|---|
| | | at 23° C. | at 150° C. | at 175° C. | at 230° C. |
| 7-10 | 285.6 | 7.0 (1.23) | 3.0 (0.53)[(a)] | 2.8 (0.49)[(a)] | 1.9 (0.33)[(a)] |
| 7-11 | 280.5 | 6.1 (1.07) | 2.6 (0.46) | 2.8 (0.49)[(a)] | 2.2 (0.39)[(a)] |

[(a)]cohesive failure of at least two of the three test samples

Example 8 and Comparative Examples C-5 and C6

Three acrylic pressure sensitive adhesives at a 90:10 monomer weight ratio were prepared without any added antioxidant (IRGANOX 1010).

Example 8(90:10 BA:AA) was prepared from SK DYNE 1310 Comparative Example C-5 (90:10 2EHA:AA) and C-6 (90:10 IOA:AA) were prepared as described above except that the solutions did not contain any added antioxidant. In addition, the IOA:AA of Comparative Example C-6 was treated with a vinyl acetate scavenger as described in U. S. Pat. No. 4,737,577 (Brown).

For all three adhesives, the % bisamide crosslinker was 0.06%, and the coated film was allowed to dry at ambient temperature for about 5 minutes before being placed in the air circulating oven at 150° C. for about 2 minutes.

The amount of bisamide crosslinker solution the weight % crosslinker based on the total weight of copolymer was 0.06%. The ratio of equivalents (amide groups) to equivalents (acid groups) is reported in Table 10.

TABLE 10

| Example | Monomers (90:10 Ratio) | Bisamide Solution (parts) | Percent Bisamide Crosslinker (%) | Eq. Amide/ Eq. Acid |
|---|---|---|---|---|
| 8 | BA/AA | 0.18 | 0.06 | 0.003489 |
| C-5 | 2EHA/AA | 0.18 | 0.06 | 0.003489 |
| C-6 | IOA/AA | 0.18 | 0.06 | 0.003489 |

Dry samples were subjected to Constant Temperature Thermogravimetric Analysis (TGA) for Weight Loss and Determination of Oxidative Onset Temperature (OOT) according to the test method outlined above. Results are in Table 11.

TABLE 11

| Example | Oxidative Onset Temp, °C. | % Wt. Loss after 3.5 hrs. | |
|---|---|---|---|
| | | at 150° C. | at 175° C. |
| 8 | 217 | 1.0 | 2.7 |
| C-5 | 200 | 1.4 | 3.8 |
| C-6 | 190 | 3.3 | 12.1 |

The data shows that the acrylic PSAs of the invention will generally provide surprisingly strong adhesive bonding without bond delamination even at high temperatures (e.g., 100 to 230° C.). Moreover, the PSAs will exhibit lower levels of outgassing in high temperature applications. This lowered level of volatiles at high temperature makes the PSAs particularity well suited for bonding applications of electronic components and the like in high temperature environments.

Various modifications and alterations of the present invention may be apparent to those skilled in the art without departing from the spirit and scope of the invention.

What is claimed is:

1. A pressure sensitive adhesive composition comprising the reaction product of a copolymer and a bisamide crosslinking agent,
   (A) the copolymer comprising the reaction product of (i) a (meth)acrylate ester of a non-tertiary alcohol in which the alkyl group contains between 1 and 4 carbon atoms, inclusive, and (ii) a carboxylic acid-functional, ethylenically unsaturated co-monomer, and
   (B) a bisamide crosslinking agent having the formula:

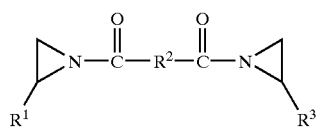

where,
$R^1$ and $R^3$ independently, are selected from the group consisting of H and $C_nH_{2n+1}$,
n is an integer ranging from 1 to 5,
$R^2$ is a divalent radical selected from the group consisting of benzeno, substituted benzeno, triazine, $C_mH_{2m}$, and combinations thereof,
m is an integer ranging from 1 to 10, and
the relative amounts of the carboxylic acid-functional, ethylenically unsaturated co-monomer and the bisamide crosslinking agent providing a ratio of the number of equivalents of amide groups to the number of equivalents of carboxylic acid groups of less than about 0.05.

2. The pressure sensitive adhesive composition of claim 1 wherein the composition further comprises an antioxidant.

3. The pressure sensitive adhesive composition of claim 1 wherein the relative amounts of the carboxylic acid-functional, ethylenically unsaturated co-monomer and the bisamide crosslinking agent providing a ratio of the number of equivalents of amide groups to the number of equivalents of carboxylic acid groups is between about 0.0001 and about 0.05.

4. The pressure sensitive adhesive composition of claim 1 wherein the carboxylic acid-functional co-monomer is selected from the group consisting of acrylic acid, methacrylic acid, and combinations thereof.

5. The pressure sensitive adhesive composition of claim 1 wherein the (meth)acrylate ester is selected from the group consisting of methyl acrylate, ethyl acrylate, propyl acrylate, n-butyl acrylate, and combinations thereof.

6. The pressure sensitive adhesive composition of claim 1 wherein the (meth)acrylate ester is n-butyl acrylate.

7. The pressure sensitive adhesive composition of claim 1 wherein the crosslinking agent comprises 1,1'-isophthaloyl-bis(2-methylaziridine).

8. The pressure sensitive adhesive composition of claim 1 wherein the amount of the co-monomer is between about 1 and about 25% by weight, inclusive, based upon the total weight of the copolymer.

9. An adhesive article comprising:
   (A) a support layer; and
   (B) the pressure sensitive adhesive composition of claim 1 disposed on the support layer.

10. The adhesive article of claim 9 wherein the composition further comprises an antioxidant.

11. The adhesive article of claim 9 wherein the relative amounts of the carboxylic acid-functional, ethylenically unsaturated co-monomer and the bisamide crosslinking agent providing a ratio of the number of equivalents of amide groups to the number of equivalents of carboxylic acid groups is between about 0.0001 and about 0.05.

12. The adhesive article of claim 9 wherein the carboxylic acid-functional co-monomer is selected from the group consisting of acrylic acid, methacrylic acid, and combinations thereof.

13. The adhesive article of claim 9 wherein the (meth) acrylate ester is selected from the group consisting of methyl acrylate, ethyl acrylate, propyl acrylate, n-butyl acrylate, and combinations thereof.

14. The adhesive article of claim 9 wherein the (meth) acrylate ester is n-butyl acrylate.

15. The adhesive article of claim 9 wherein the crosslinking agent comprises 1,1'-isophthaloyl-bis(2-methylaziridine).

16. The adhesive article of claim 9 wherein the amount of the co-monomer is between about 1 and about 25% by weight, inclusive, based upon the total weight of the copolymer.

17. A method for adhering a first substrate and a second substrate to one another, the method comprising:
(A) providing a pressure sensitive adhesive composition as in claim 1;
(B) adhering the pressure sensitive adhesive composition to the first substrate; and
(C) adhering the pressure sensitive adhesive composition to the second substrate to bond the first and second substrates together.

18. The method of claim 17 wherein at least one of the first substrate and the second substrate are operatively associated with a heat source capable of causing the temperature of the first substrate or the second substrate to be within the range from about 100° C. to about 230° C.

19. The method of claim 17 further comprising (D) heating at least one of the first substrate and the second substrate to a temperature within the range from about 100° C. to about 230° C. without causing the pressure sensitive adhesive to detach from the first substrate or the second substrate.

20. A method according to claim 17 wherein the pressure sensitive adhesive further comprises an antioxidant.

21. A method according to claim 17 wherein at least one of the first substrate and the second substrate comprises a metal.

22. A method according to claim 17 wherein at least one of the first substrate and the second substrate comprises silicon.

23. A method according to claim 17 wherein at least one of the first substrate and the second substrate comprises a printed circuit.

24. A method according to claim 23 wherein the printed circuit is a printed circuit board.

25. A method according to claim 23 wherein the printed circuit is a flexible circuit.

26. A method according to claim 17 wherein at least one of the first substrate and the second substrate comprises plastic.

27. A method according to claim 17 wherein the relative amounts of the carboxylic acid-functional, ethylenically unsaturated co-monomer and the bisamide crosslinking agent providing a ratio of the number of equivalents of amide groups to the number of equivalents of carboxylic acid groups is between about 0.0001 and about 0.05.

28. A method according to claim 17 wherein the carboxylic acid-functional co-monomer is selected from the group consisting of acrylic acid, methacrylic acid, and combinations thereof.

29. A method according to claim 17 wherein the (meth) acrylate ester is selected from the group consisting of methyl acrylate, ethyl acrylate, propyl acrylate, n-butyl acrylate, and combinations thereof.

30. A method according to claim 17 wherein the crosslinking agent comprises 1,1'-isophthaloyl-bis(2-methylaziridine).

31. A method according to claim 17 wherein the amount of the ethylenically unsaturated co-monomer is between about 1 and about 25% by weight, inclusive, based upon the total weight of the copolymer.

32. A method according to claim 17 wherein the first substrate comprises a heat sink to a printed circuit and the second substrate comprises a surface in an automobile control module assembly.

33. A method according to claim 17 wherein the first substrate comprises a ceramic cook top on a stove and the second substrate comprises a coated metal.

* * * * *

UNITED STATES PATENT AND TRADEMARK OFFICE
CERTIFICATE OF CORRECTION

PATENT NO.   : 6,893,718 B2
DATED        : May 17, 2005
INVENTOR(S)  : Melancon, Kurt C.

It is certified that error appears in the above-identified patent and that said Letters Patent is hereby corrected as shown below:

Column 12,
Line 33, delete "solution 1" and insert in place thereof -- solution I --;

Column 15,
Line 62, delete "particularity" and insert in place thereof -- particularly --.

Signed and Sealed this

Fourth Day of October, 2005

JON W. DUDAS
*Director of the United States Patent and Trademark Office*